(12) United States Patent
Krebs et al.

(10) Patent No.: US 8,607,950 B2
(45) Date of Patent: Dec. 17, 2013

(54) DUAL CLUTCH

(71) Applicant: Schaeffler Technologies AG & Co., KG, Herzogenaurach (DE)

(72) Inventors: Florian Krebs, Baden-Baden (DE); René Daikeler, Buehlertal (DE); Karl-Ludwig Kimmig, Ottenhoefen (DE); Olaf Werner, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/646,333

(22) Filed: Oct. 5, 2012

(65) Prior Publication Data

US 2013/0025995 A1  Jan. 31, 2013

Related U.S. Application Data

(63) Continuation of application No. PCT/DE2011/000335, filed on Mar. 28, 2011.

(30) Foreign Application Priority Data

Apr. 8, 2010 (DE) .......................... 10 2010 014 192

(51) Int. Cl.
*F16D 21/06* (2006.01)
*F16D 25/10* (2006.01)

(52) U.S. Cl.
USPC ................................. 192/48.606; 192/110 B

(58) Field of Classification Search
USPC ........................... 192/48.602, 48.603, 48.606
See application file for complete search history.

(56) References Cited

U.S. PATENT DOCUMENTS

| 4,116,322 | A | * | 9/1978 | Ashfield | 192/48.8 |
| 4,520,913 | A | * | 6/1985 | Maucher et al. | 192/48.8 |
| 2002/0060118 | A1 | | 5/2002 | Beneton et al. | |
| 2003/0024788 | A1 | * | 2/2003 | Damm et al. | 192/48.8 |
| 2003/0106767 | A1 | | 6/2003 | Beneton et al. | |
| 2005/0034955 | A1 | | 2/2005 | Meinhard et al. | |
| 2008/0230342 | A1 | * | 9/2008 | Friedmann et al. | 192/48.1 |
| 2011/0114435 | A1 | | 5/2011 | Noehl et al. | |

FOREIGN PATENT DOCUMENTS

| DE | 1956781 | 5/1971 |
| DE | 19953091 | 8/2001 |
| DE | 10116705 | 10/2001 |
| DE | 10155458 | 5/2002 |
| DE | 102009030975 | 1/2010 |
| EP | 1479934 | 11/2004 |

(Continued)

*Primary Examiner* — Rodney Bonck
(74) *Attorney, Agent, or Firm* — Simpson & Simpson, PLLC

(57) ABSTRACT

A dual clutch having a first transmission-side output shaft and/or a second transmission-side output shaft having a first clutch comprising a first pressure plate that is axially movable relative to a first counterplate for engaging a first clutch disk connected to a first output shaft, a second clutch comprising a second pressure plate that is axially movable relative to a second counterplate for engaging a second clutch disk connected to a second output shaft, an actuating device for moving the first pressure plate and/or the second pressure plate and a fastening plate connected to the actuation device for axially fastening to a clutch housing, wherein the actuating device is designed to pre-center relative to the clutch housing and/or the transmission housing in a radially adjustable manner, and the fastening plate is designed to be radially fixed to the clutch housing and/or the transmission housing.

13 Claims, 6 Drawing Sheets

(56) References Cited

FOREIGN PATENT DOCUMENTS

| | | |
|---|---|---|
| EP | 1524446 | 4/2005 |
| FR | 2851626 | 8/2004 |
| FR | 2851627 | 8/2004 |

\* cited by examiner

DUAL CLUTCH

CROSS-REFERENCE TO RELATED APPLICATIONS

This application is filed under 35 U.S.C. §120 and §365(c) as a continuation of International Patent Application No. PCT/DE2011/000335 filed Mar. 28, 2011 and claiming priority of German Patent Application No. 10 2010 014 192.5 filed Apr. 8, 2010, which applications are incorporated herein by reference to their entireties.

FIELD OF THE INVENTION

The invention relates to a dual clutch by means of which an engine-side input shaft of a motor vehicle can be coupled to two coaxially arranged transmission-side output shafts without any substantial interruption in tractive force.

BACKGROUND OF THE INVENTION

A dual clutch is known from EP 1 524 446 A1 for coupling an engine-side input shaft to two different output shafts arranged coaxially in relation to each other. The dual clutch has a first clutch and a second clutch, wherein the respective clutch has a pressure plate that is axially movable relative to a counterplate for engaging the respective clutch with the associated output shaft. In addition, a co-rotating clutch cover is provided that is bolted to a second counterplate which in turn is bolted to the first counterplate. In addition, a fixed actuating device is provided for moving the first pressure plate and/or the second pressure plate. The actuating device is bolted and axially fixed to a transmission housing of a motor vehicle transmission. At the engine side, the first counterplate of the dual clutch is connected via a flexible plate (flexplate) to a crankshaft of an internal combustion engine of a motor vehicle.

There is a long-felt need to simplify the installation of the dual clutch on the transmission and internal combustion engine, even when the participating components may have tolerance-related manufacturing inaccuracies.

BRIEF SUMMARY OF THE INVENTION

The dual clutch according to the invention for coupling an engine-side input shaft to a first transmission-side output shaft and/or a second transmission-side output shaft has a first clutch that comprises a first pressure plate that is axially movable relative to the first counterplate for coupling a first clutch disk connected to the first output shaft. In addition, the dual clutch has a second clutch that comprises a second pressure plate that is axially movable relative to a second counterplate for coupling a second clutch disk connected to a second output shaft. In addition, an actuation device is provided for moving the first pressure plate and/or the second pressure plate, wherein a fastening plate is connected to the actuation device for axially fastening to a clutch housing of the dual clutch and/or to a transmission housing of a motor vehicle transmission. According to the invention, the actuating device is designed to pre-center relative to the clutch housing and/or transmission housing in a radially adjustable manner, and the fastening plate is designed to be radially fixed to the clutch housing and/or the transmission housing. Alternatively, the fastening plate is designed to pre-center relative to the clutch housing and/or transmission housing in a radially adjustable manner, and the actuating device is designed to be radially fixed to the clutch housing and/or the transmission housing. By distributing temporary pre-centering and definitive final centering to different components, that is, the fastening device and the fastening plate, the dual clutch can be initially installed very easily on a motor vehicle transmission with transmission-side radial play, even when the participating components have tolerance-related manufacturing inaccuracies, wherein the dual clutch can be radially fixed after the dual clutch is mounted on the output shaft connected to the motor vehicle transmission to simplify the additional mounting and adjustment steps.

The object of the invention is to simplify the installation of the dual clutch even when the participating components have tolerance-related manufacturing inaccuracies.

The dual clutch according to the invention for coupling an engine-side input shaft to a first transmission-side output shaft and/or a second transmission-side output shaft has a first clutch that comprises a first pressure plate that is axially movable relative to the first counterplate for coupling a first clutch disk connected to the first output shaft. In addition, the dual clutch has a second clutch that comprises a second pressure plate that is axially movable relative to a second counterplate for coupling a second clutch disk connected to a second output shaft. In addition, an actuation device is provided for moving the first pressure plate and/or the second pressure plate, wherein a fastening plate is connected to the actuation device for axially fastening to a clutch housing of the dual clutch and/or to a transmission housing of a motor vehicle transmission. According to the invention, the actuating device is designed to pre-center relative to the clutch housing and/or transmission housing in a radially adjustable manner, and the fastening plate is designed to be radially fixed to the clutch housing and/or the transmission housing. Alternatively, the fastening plate is designed to pre-center relative to the clutch housing and/or transmission housing in a radially adjustable manner, and the actuating device is designed to be radially fixed to the clutch housing and/or the transmission housing.

By distributing temporary pre-centering and definitive final centering to different components, that is, the fastening device and the fastening plate, the dual clutch can be initially installed very easily on a motor vehicle transmission with transmission-side radial play, even when the participating components have tolerance-related manufacturing inaccuracies, wherein the dual clutch can be radially fixed after the dual clutch is mounted on the output shaft connected to the motor vehicle transmission so as to simplify the additional mounting and adjustment steps. The actuating device or the fastening plate can be designed to be inserted in the clutch housing and/or in the transmission housing with play, and/or tiltable and/or pivotable with a radial movement component perpendicular to the rotary axis of the output shafts. For example, the fastening plate can provide approximate radial pre-centering with the assistance of pins having radial play, wherein the final centering in the radial direction can occur by subsequently inserting the actuating device essentially without play into a corresponding opening of the clutch housing and/or the transmission housing. For pre-centering, the actuating device can be preferably inserted with play into a corresponding opening of the clutch housing and/or the transmission housing and/or the fastening plate, wherein the final centering can occur in particular by bolting the fastening plate to the clutch housing and/or to the transmission housing substantially without play. The actuating device comprises in particular a stop that projects radially outward back and contacts the clutch housing and/or the transmission housing, thereby defining a maximum axial end position of the dual clutch. The fastening plate has in particular an extension radially to the outside, which is chosen such that the radial extension of the fastening plate radially to the outside is greater than the radial extension of the first clutch and/or the second clutch radially to the outside. This allows the fastening plate to be easily bolted or riveted to the clutch housing and/or to the transmission housing with the assistance of a tool substantially parallel to the rotary axis of the output shafts and at a radial distance from the clutches. The fastening plate can in particular be connected as a rigid disk (drive plate) and/or a bendable and/or flexible disk (flexplate) to the clutch housing and/or to the transmission housing, wherein the disk can transmit torque in order to position the actuating device in an essentially torque-proof manner. The flexible design of the disk allows arising vibrations to be completely or partially dampened or canceled. At the same time, when mounting the dual clutch on the motor vehicle transmission, axial yield is provided along the spring excursion of the flexible disk that keeps the dual clutch from being damaged while being mounted and makes it easier to compensate for manufacturing tolerances.

The respective clutch disk can be connected to the respective output shaft without rotation but allowing axial movement. The first counterplate or the second counterplate, as a separate component, can be located at a distance radially inward from a clutch housing wall radially to the outside, and/or from a first clutch cover that at least partially covers the first clutch and/or the second clutch. It is also possible for the first counterplate or the second counterplate to be designed as a single piece with the clutch housing wall and/or with the clutch cover. For example, one of the counterplates can be formed by a flywheel connected to the engine-side input shaft, or an output flange of a dual mass flywheel. The respective clutch disk can in particular have a friction lining on axial faces facing away from each other that can contact a friction lining of the associated counterplate and/or pressure plate that may be provided to form a friction lock in order to engage the respective clutch. The respective clutch disk can be connected to the respective output shaft without rotation but allowing axial movement. The respective pressure plates and counterplates are designed as separate, functionally segregated components, thus enabling a so-called "four-disk design" for the dual clutch without significantly increasing the installation space. The dual clutch can in particular be directly or indirectly connected to an engine-side upstream and/or transmission-side downstream vibration damper, in particular to a dual-mass flywheel, and/or centrifugal pendulum-type absorber, and/or a deflection pendulum. Furthermore, the respective clutch disk can in particular be dampened with the assistance of a dual-mass flywheel, and/or a centrifugal pendulum-type absorber, and/or a deflection pendulum. The dual clutch can in particular be connected to the input shaft by means of a rigid disk (drive plate) and/or a bendable and/or flexible disk (flexplate), wherein the disk can transmit torque to allow the torque of the input shaft to be introduced into the dual clutch. The flexible design of the disk allows arising vibrations to be completely or partially dampened or canceled. At the same time, there remain sufficient connecting options to connect a torsional vibration damper on the engine side to the dual clutch, especially a dual-mass flywheel to the dual clutch. The first clutch and/or the second clutch are particularly designed as a dry clutch so that the respective clutch disk can be engaged without requiring additional lubricant.

In particular, the first counterplate can be directly or indirectly braced radially against the input shaft with the assistance of an input bearing and/or against the first output shaft, wherein the first counterplate can be braced in an axially fixed or axially movable manner with the assistance of the input bearing. By additionally bracing the dual clutch at the engine side by means of the input bearing, arising radial force can be deflected both at the transmission side and engine side. The arising force can be better distributed, thereby avoiding any unnecessarily high flexural torque within the dual clutch. By axially fixing the input bearing, the dual clutch can be pliably connected in an axial direction, which makes it easier to operate the dual clutch within the intended speed range beyond the critical level of vibration, so that component stress from resonance effects and undesirable noise generation can be avoided. Axially fixing the input bearing reliably prevents the outer ring and inner ring of the input bearing from unintentionally falling apart, which makes installation easier.

It is preferable that the first counterplate can be braced against the input shaft by means of a bearing hub, preferably within the input shaft. The bearing hub is in particular designed as a sheet-metal component connected to the first counterplate, wherein the bearing hub can be manufactured in particular by stamping and subsequent non-cutting shaping steps, especially by bending and deep-drawing. The bearing hub can preferably be designed in the form of a cup and form contact surfaces running in an axial direction that allow it to shift axially relative to the input shaft and/or to the first output shaft. The bearing hub can in particular form a clearance fit to the first output shaft to allow engine-side pre-centering. The bearing hub can also be braced against the first output shaft by means of an internal bearing, or form a friction bearing with the first output shaft. The bearing hub is in particular braced radially within the input shaft by means of a pilot bearing provided within the input shaft. With the assistance of the bearing hub that in particular can have a plurality of steps at different diameters, the first counterplate can be easily connected and braced in the area of the dual clutch against the input shaft past the first output shaft.

It is particularly preferable for the actuating device to have an especially annular peripheral bearing ball that projects radially and/or axially outward for contacting a bearing surface of the transmission housing and/or the clutch housing, wherein in particular the selected curvature of the bearing ball is such that the theoretical midpoint of the curvature of the bearing ball basically lies on the rotary axis of the first output shaft and the second output shaft. The contour of the bearing ball is essentially spherical. The bearing surface can, for example, be designed to be cylindrical or corresponding to the bearing ball. The bearing ball can directly contact the bearing surface. It is, however, also possible to provide the fastening plate between the bearing ball and bearing surface, wherein the fastening plate is in particular clamped between the bearing ball and bearing surface. The bearing ball can compensate for tilting moment acting on the actuating device and simultaneously deflect force arising in the radial direction to the transmission housing or clutch housing. The curvature of the bearing ball can create a linear contact between the actuating device and the housing to prevent the actuating device from tilting in the housing. This makes it easier to install the dual clutch on the transmission since a certain amount of non-parallel skew of the dual clutch is permissible in relation to the output shafts connected to the transmission. In particular, when the bearing ball and bearing surface abut each other with an axial component, the theoretical midpoint of the curvature preferably lies in an axial direction, essentially in the middle, at the height of the engine-side radial support of the dual clutch, that is, in particular at the height of the input bearing and/or at the height of a bearing arranged within the input shaft to support the first output shaft.

It is preferable if the first output shaft abuts the input shaft, preferably radially inward, especially via a floating bearing. It is therefore unnecessary to provide a bearing hub with the input shaft to accommodate and support the inner, first output shaft. Instead, the input shaft can have a front recess, particularly a blind hole, to support the inner, first output shaft and to deflect the arising force. The first output shaft can be supported by a pilot bearing, especially within the input shaft, so that the first output shaft can be additionally reinforced and transfer greater flexural torque.

In a preferred embodiment, the first input shaft can be inserted in the first counterplate with a clearance fit to establish preliminary centering. The first counterplate, or a component connected to the first counterplate, can, e.g., have a hole with a slightly larger diameter than the outer diameter of the first output shaft. During installation, the dual clutch can abut the first output shaft via the first counterplate and already be positioned close to the intended end position. Mounting the dual clutch on the first output shaft connected to a motor vehicle transmission automatically results in an initial pre-centering. In particular, it is only after this pre-centering occurs that the first counterplate abuts and is supported by the input shaft when the motor vehicle transmission is connected to the internal combustion engine. In particular, the dual clutch is already suitably aligned before the first counterplate is preferably inserted via a bearing hub connected to the counterplate into a pilot bearing provided within the first input shaft. In this case, to achieve the suitable pre-centering, the bearing hub can be braced against the first output shaft via a bearing, especially a roller bearing, instead of the clearance fit. Given the clearance fit between the first output shaft and the first counterplate, it is unnecessary to simultaneously suitably align the dual clutch when connecting the motor vehicle transmission to the internal combustion engine. In addition, the clearance fit prevents unnecessary frictional contact between the first counterplate or the bearing hub and the first output shaft after connecting the motor vehicle transmission to the internal combustion engine.

The first output shaft and the second output shaft are preferably braced against each other via an internal bearing. This additionally reinforces the output shaft to prevent unnecessarily high flexural torque in the output shafts. In particular when one output shaft is engaged and the other output shaft is disengaged, flexural torque arising in the engaged output shaft can be partially absorbed and transmitted by the other output shaft.

In particular, the first counterplate is connected to at least one catch projecting at the engine side, wherein the catch is designed in particular such that a spline connection can be created with a torsional vibration damper, in particular a dual-mass flywheel. The catch can form a stop by means of which the torque of the input shaft can be introduced into the clutches of the dual clutch. For installation, it is only necessary to move a module, particularly a torsional vibration damper, in the axial direction relative to the first counterplate toward the first counterplate. This creates a rotationally fixed connection which is correspondingly easy to create and which in turn yields a dual clutch design that is easy to create and install. The catch only has to be inserted into the corresponding component to create the spline connection. It is particularly preferable for the catch to lie on a stop surface facing the peripheral direction of an output flange of a dual-mass flywheel. In addition, axial spacing errors arising from manufacturing tolerances or axial relative movements between the input shaft and the output shafts can be compensated for automatically. The catch can be designed as a single piece with the first counterplate and/or as a single piece with the bearing hub, or screwed or riveted to the first counterplate as a separate component.

In particular, a cover bearing is provided between the actuating device and a clutch cover connected to the first counterplate and/or the second counterplate. By means of the cover bearing, force arising from the actuating device can be transmitted to the clutch cover. At the same time, this ensures that the co-rotating clutch cover can execute relative movement in relation to the actuating device.

It is particularly preferable for the actuating device to be connected to the first pressure plate via a first actuating cup having a substantially radial first section, and to the second pressure plate via a second actuating cup having a substantially radial second section, wherein the cover bearing is at a distance from the first section of the first actuating cup and from the second section of the second actuating cup at the input side or output side. When the cover bearing is axially offset at the input side, i.e., at the engine side, to the first section and the second section, the arising force can be absorbed relatively far inside the dual clutch and transmitted via the clutch cover to the input shaft. A section of the clutch cover projecting in an axial direction is thereby avoided or strongly reduced; consequently, the flexural torque acting on the clutch cover is correspondingly low. When the clutch cover is at a distance from the first section and the second section at the output side, i.e., the transmission side, the first actuating cup and second actuating cup are basically arranged within the clutch cover. It is therefore unnecessary for the actuating fingers connected to the respective pressure plate to be guided through corresponding openings in the clutch cover. Instead, the clutch cup can encompass both the first actuating cup and the second actuating cup without openings, which can weaken the clutch cup, having to be provided in the actuating cup. This allows the clutch cup to have a simpler design and transmit greater force.

In particular, the cover bearing is arranged in an axial direction next to the actuating device, wherein the cover bearing is connected via an especially tubular retaining plate and connected to the actuating device. As the cover bearing does not have to be arranged radially to the outside of the actuating device, the installation space in an axial direction can be reduced. Instead, the cover bearing can be arranged in an area where the cover bearing is arranged in an axial direction at the level of another component, such as one of the pressure plates. This does not significantly increase the installation space of the dual clutch in an axial direction. The retaining plate can form a shoulder projecting radially to the outside to securely accommodate the cover bearing between the retaining plate and the actuating device. The retaining plate can, in particular, be securely connected on the transmission side to the actuating device, for example with the assistance of a locking ring. The retaining plate may lie against the bearing provided between the actuating device and one of the output shafts and abut it in a radial direction. This provides a simple design enabling force to be deflected in a particularly easy matter.

In particular, the actuating device comprises a first piston for axially moving the first pressure plate with the assistance of a first actuating cup, and a second piston to axially move the second pressure plate with the assistance of a second actuating cup, wherein the actuation path of the first piston substantially corresponds to the displacement path of the first pressure plate, and/or the actuation path of the second piston substantially corresponds to the displacement path of the second pressure plate. This creates a directly actuated, transmission-free clutch. The respective actuating cup is not swung; consequently, the corresponding components for enabling the respective actuating cup to swing can be dispensed with. Assuming an ideally rigid actuating cup, the actuation path of the respective piston precisely corresponds to the displacement path of the associated pressure plate. The displacement path of the respective pressure plate differs from the actuating path of the associated piston only by the path in an axial direction by which the associated actuating cup is elastically bent when the respective clutch is actuated.

The actuating device preferably includes a first annular pressure cylinder to move the first pressure plate, and a second annular pressure cylinder to move the second pressure plate, wherein the first pressure cylinder and second pressure cylinder are arranged coaxially in relation to each other. The coaxial arrangement of the pressure cylinders with an annular design yields a particularly compact and installation-space-saving design for the actuating device. Given the compact design of the actuating device, the actuating device has a comparatively low intrinsic weight such that the intrinsic weight of the actuating device can be easily deflected by the clutch cover.

It is particularly preferable for a first actuating cup connected to the first pressure plate to be mounted on the actuating device via a first cup bearing, and the first cup bearing is arranged radially inward in relation to the first pressure cylinder, and/or radially inward in relation to the second pressure cylinder at least partially at the level of the first pressure cylinder and/or at the level of a second pressure cylinder. In addition or alternatively, a second actuating cup connected to the second pressure plate is preferably borne on the actuating device via a second cup bearing, and the second cup bearing is arranged radially inward in relation to the first pressure cylinder, and/or radially inward in relation to the second pressure cylinder at least partially at the level of the first pressure cylinder and/or at the level of a second pressure cylinder. The first cup bearing or the second cup bearing can be arranged in an axial direction essentially at least partially at the same axial level in relation to the first pressure cylinder and/or the second pressure cylinder such that, viewed in a radial direction, the first cup bearing or the second cup bearing at least partially overlaps the first pressure cylinder and/or the second pressure cylinder. The first pressure cylinder and/or the second pressure cylinder can have a correspondingly larger diameter so that the first cup bearing and/or the second cup bearing can be arranged with a correspondingly smaller diameter within the first pressure cylinder and/or within the second pressure cylinder. In particular, the first cup bearing and/or the second cup bearing are guided in substantially axial and preferably annular recesses of the actuating device, and are braced against the actuating device both radially to the inside and radially to the outside. A first piston that can be actuated by the first pressure cylinder does not have to contact the radial inner end of the first actuating cup; instead, it can contact the first actuating cup at a slight distance from the radial inner end of the first actuating cup. Correspondingly, a second piston that can be actuated by the second pressure cylinder does not have to contact the radial inner end of the second actuating cup; instead, it can contact the second actuating cup at a slight distance from the radial inner end of the second actuating cup. By being braced against the respective actuating cup at a distance, the force arising from the actuation of the actuating device can be deflected so that the flexural torque arising in the respective actuating cup can be reduced. This enables a simplified design that in particular allows for the simplified deflection of arising force. Since the respective cup bearing does not necessarily have to be arranged axially alongside the actuating device and can be shifted into the actuating device, the installation space of the dual clutch can be significantly reduced in an axial direction. This makes it possible to correspondingly shorten the output shafts so that less flexural torque arises in the output shafts, and/or greater loads can be transmitted. A gear drivetrain with such a dual clutch can therefore have a smaller, more compact and simultaneously more robust and powerful design.

The invention also relates to a gear drivetrain for a motor vehicle comprising a motor-side input shaft, a first transmission-side output shaft, a second transmission-side output shaft, and a dual clutch for engaging the input shaft with the first output shaft and/or the second output shaft, wherein the dual clutch can be designed and developed as described above. The dual clutch makes the gear drivetrain easier to install even when the participating components have tolerance-related manufacturing inaccuracies.

BRIEF DESCRIPTION OF THE DRAWINGS

The invention will be explained in preferred exemplary embodiments with reference to the accompanying drawings. The figures show the following.

DETAILED DESCRIPTION OF THE INVENTION

Figure 1:
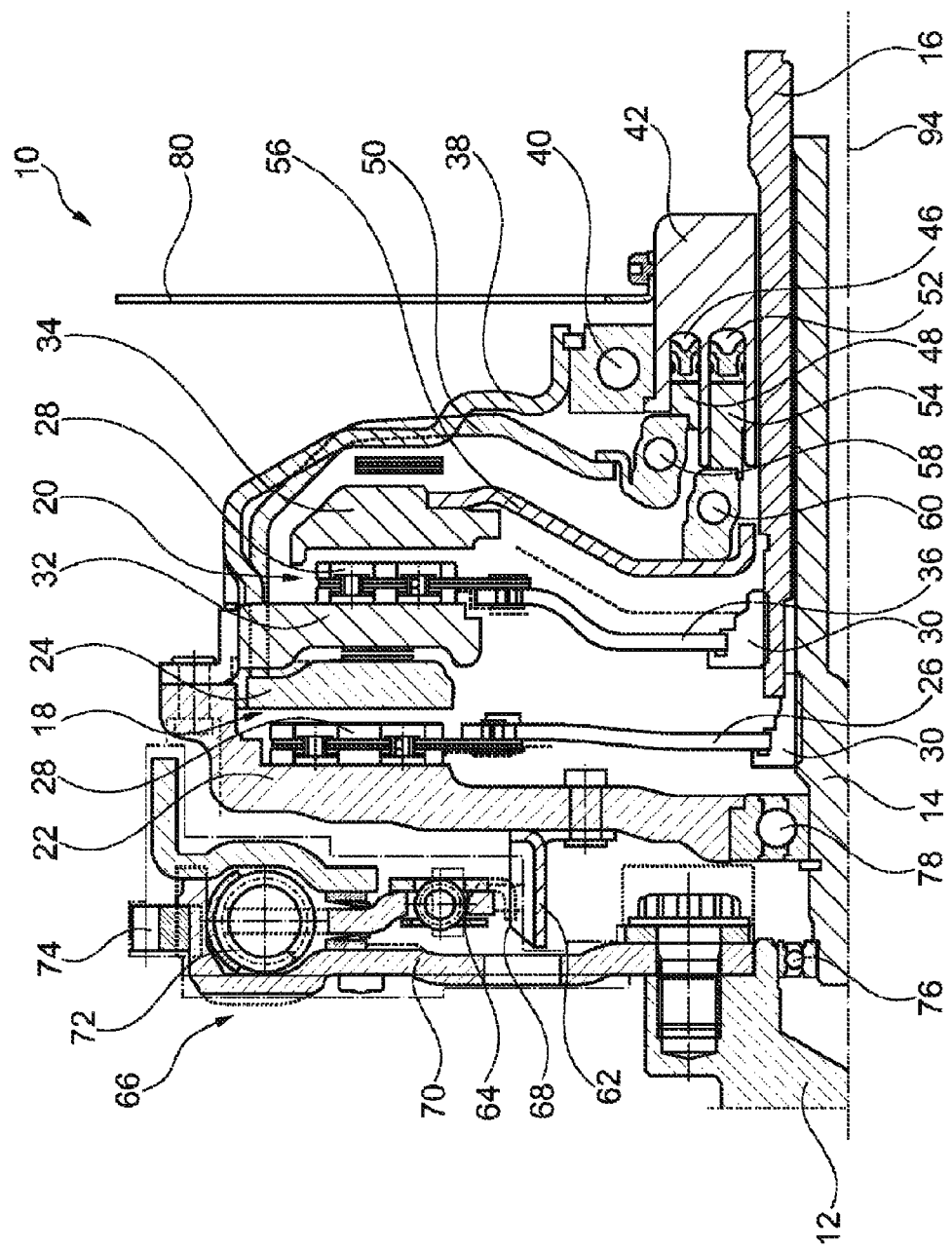
FIG. 1 is a schematic sectional view of a dual clutch in a first embodiment.

The dual clutch 10 shown in FIG. 1 can engage a first input shaft 12 with an inner, first output shaft 14 and/or an outer second output shaft 16 arranged to be coaxial with the first output shaft 14. The dual clutch 10 comprises a first clutch 18 and a second clutch 20. The first clutch 18 has a pressure plate 24 that is axially movable relative to a first counterplate 22 to engage in a friction lock via friction linings 28 with a first clutch disk 26 arranged between the first the counterplate 22 and the first pressure plate 24. The first clutch disk 26 can be connected via teeth 30 in a non-rotatable but axially movable manner to the first output shaft 14. Correspondingly, the second clutch 20 has a second pressure plate 34 that is axially shiftable relative to a second counterplate 32 to engage in a friction lock via friction linings 28 with a second clutch disk 36 arranged between the second counterplate 32 and the second pressure plate 34. The second clutch disk 36 can be connected via teeth 30 in a non-rotatable but axially movable manner to the second output shaft 16. The first pressure plate 24 is arranged between the first counterplate 22 and the second counterplate 32, wherein the first counterplate 22 and second counterplate 32 are designed as separate components.

The first counterplate 22 and second counterplate 32 are connected to a clutch cover 38 that is connected via a bearing cover 40 to an actuating device 42. The actuating device 42 is designed to be non-rotatable and is braced against the second output shaft 16 via an output bearing in the form of a needle bearing (not shown) to deflect radial force. The actuating device 42 has an annular, first pressure cylinder 46 by means of which a first piston 48 can be extended. The first piston 48 shifts a first actuating cup 50 in a purely axial direction to move the first pressure plate 24 toward the first counterplate 22 to engage the first clutch 18. Correspondingly, the actuating device 42 has an annular second pressure cylinder 52 coaxial to the first annular pressure cylinder 46 and arranged radially to the inside by means of which a second piston 54 can be extended. The second piston 54 can move a second actuating cup 56 in a purely axial direction to move the second pressure plate 34 toward the second counterplate 32 to engage the second clutch 20. The first actuating cup 50 is connected to the first piston 48 by means of a first cup bearing 58. The second actuating cup 56 is correspondingly connected to the second piston 54 by means of a second cup bearing 60.

The first counterplate 22 is connected to a catch 62 that, on its side facing radially outward, forms a spline connection 68 together with an output flange 64 of a dual-mass flywheel 66. The dual-mass flywheel 66 is connected to the input shaft 12 via an input flange 70. The input flange 70 is connected via at least one bow spring 72 to the output flange 64. In addition, the input flange 70 is connected to a starter crown 74. In addition, the first output shaft 14 is radially braced within the input shaft 12 by means of a pilot bearing 76. The first output shaft 14 can be braced against the second output shaft 16 by means of another bearing (not shown). In addition, the first counterplate 22 is braced against the first output shaft 14 in the portrayed exemplary embodiment by means of an axially fixed input bearing 78.

In the exemplary embodiment shown in FIG. 1, the actuating device 42 is, for example, connected and centered, for example, via a press fit to a fastening plate 80. The fastening plate 80 can be designed as a flexplate. The fastening plate 80 can provide initial pre-centering with radial play in that the fastening plate 80 can be loosely inserted by means of pins (not shown) with a clutch housing 82 and/or a transmission housing.

Figure 2:
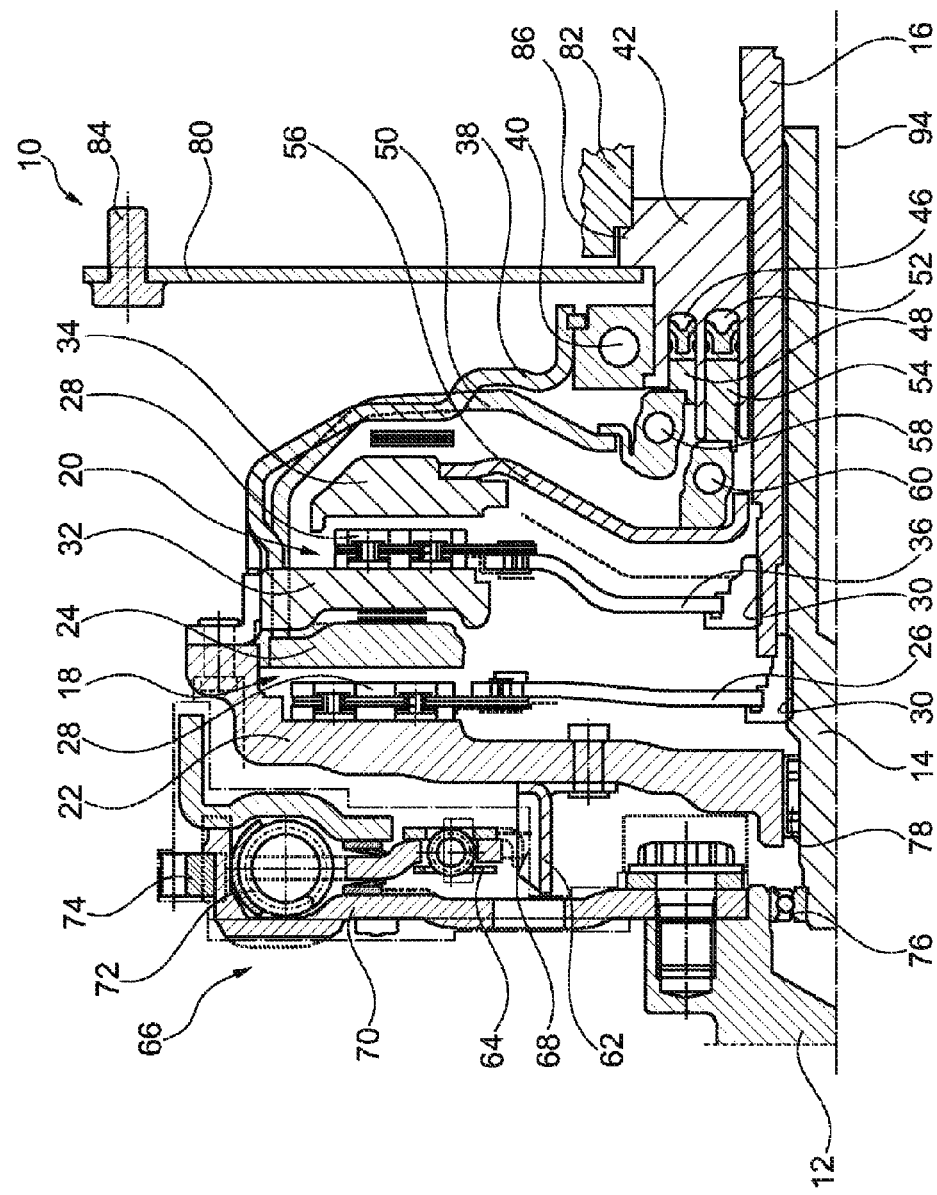
FIG. 2 is a schematic sectional view of a dual clutch in a second embodiment.

In the embodiment of the dual clutch 10 shown in FIG. 2, the input bearing 78 is not actually fixed but is rather designed to be axially movable in comparison to the embodiment of the dual clutch 10 shown in FIG. 1. In addition, the actuating device 42 is inserted into the clutch housing 82 with radial play to provide initial pre-centering when mounting the dual clutch 10 on the output shafts 14, 16. The final centering is accomplished by means of the fastening plate 80 that can be fastened substantially free of play in a radial direction with the aid of a screwed connection 84. In the portrayed exemplary embodiment, the fastening plate 80 is designed as a bracing plate which is comparatively rigid in an axial direction. The actuating device 42 further comprises a stop 86 that contacts the clutch housing 82 and limits the axial insertion depth of the actuating device 42 in the clutch housing 82.

Figure 3:
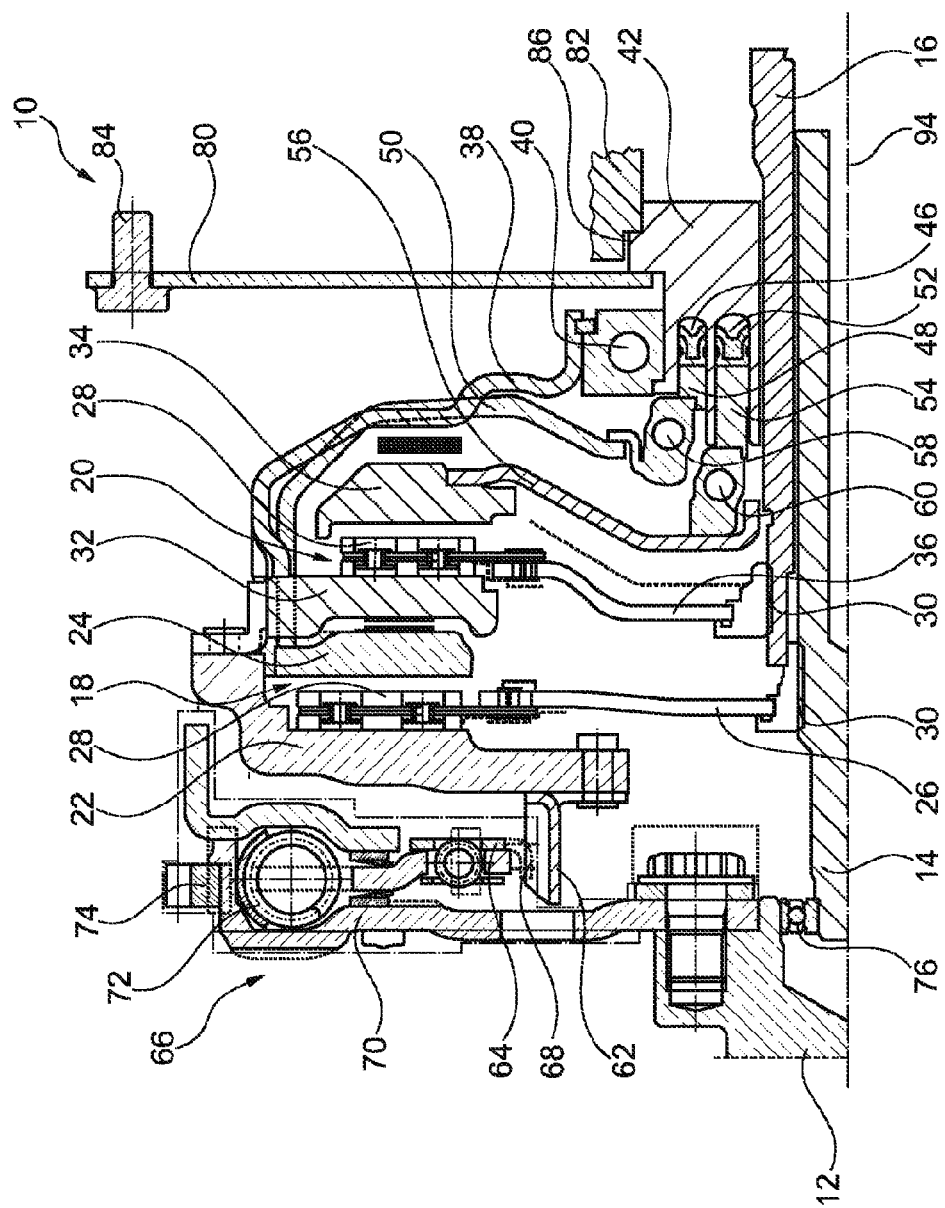
FIG. 3 is a schematic sectional view of a dual clutch in a third embodiment.

In the embodiment of the dual clutch 10 shown in FIG. 3, the input bearing 78 is discarded in comparison to the embodiment of the dual clutch 10 shown in FIG. 2. The first counterplate 22 can therefore be designed to be shorter extending radially inward. Furthermore, two radial restrictions for supporting the dual clutch 10 can be avoided.

Figure 4:
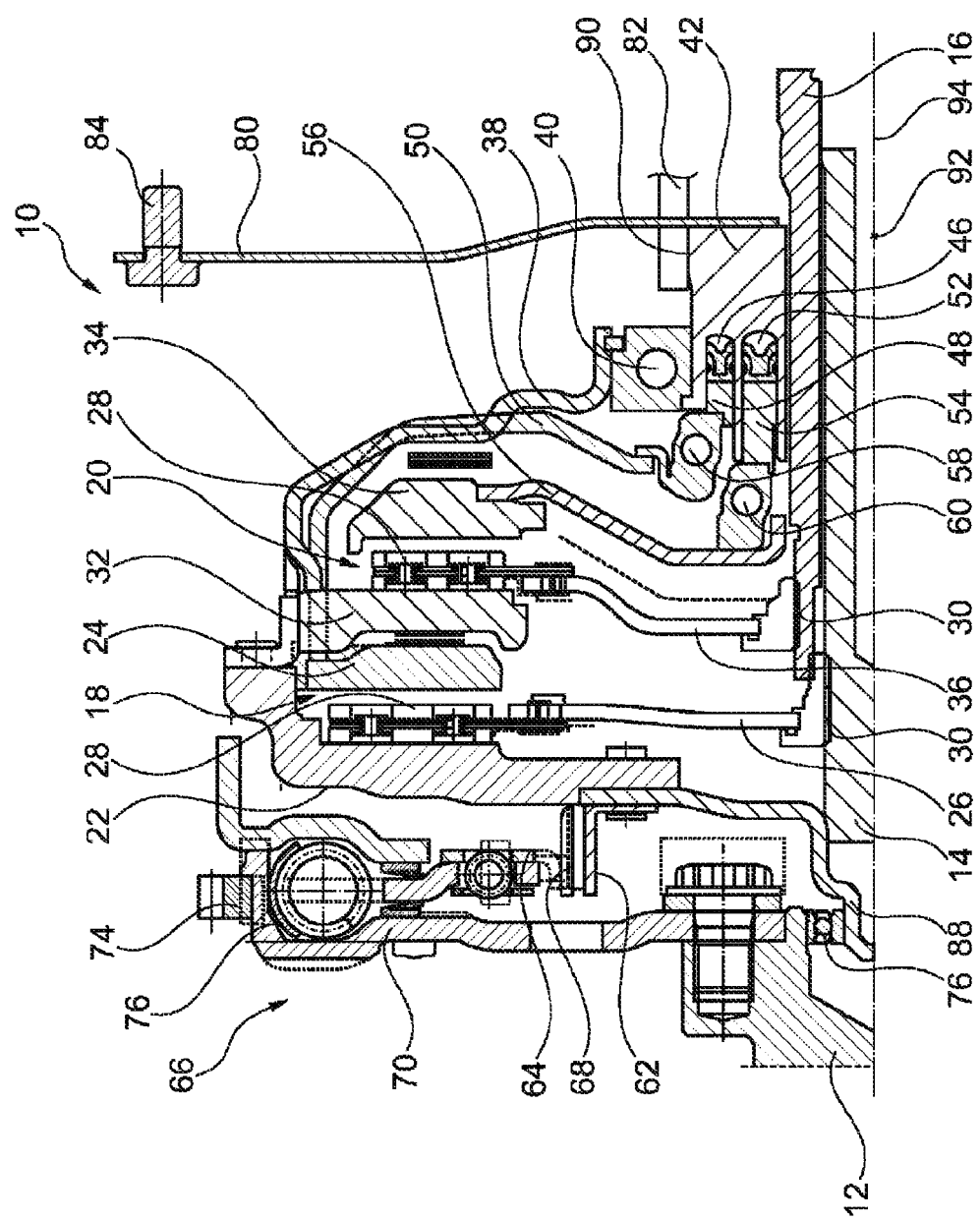
FIG. 4 is a schematic sectional view of a dual clutch in a fourth embodiment.

In the embodiment of the dual clutch 10 shown in FIG. 4, the first counterplate 22 is braced within the input shaft 12 via the pilot bearing 76 with the assistance of the bearing hub 88 screwed to the first counterplate 22 in comparison to the embodiment of the dual clutch 10 shown in FIG. 2. The first output shaft 14 in this case is not braced against the input shaft 12 by means of the pilot bearing 76. The bearing hub 88 can form a clearance fit with the first output shaft 14 to initially pre-center the dual clutch 10 with the first output shaft 14 before the bearing hub 88 is braced via the pilot bearing 76 against the input shaft. Furthermore, the actuation device 42 is pre-centered in the clutch housing 82 via a substantially spherical peripheral bearing ball 90 projecting radially outward in comparison to the embodiment of the dual clutch 10 portrayed in FIG. 2. The clutch housing 82 is designed substantially cylindrical in the area of the bearing ball 90. The stop 86 has been dispensed with. The bearing ball 90 has a theoretical midpoint 92 that lays on a rotary axis 94 of the first output shaft 14 and second output shaft 16. In addition or alternatively, the actuating device 42 can also be braced via a bearing, especially a needle bearing, against the clutch housing 82 or the second output shaft 16. Furthermore, in the portrayed exemplary embodiment, the fastening plate 80 is designed as a flexplate that is comparatively flexible in an axial direction.

Figure 5:
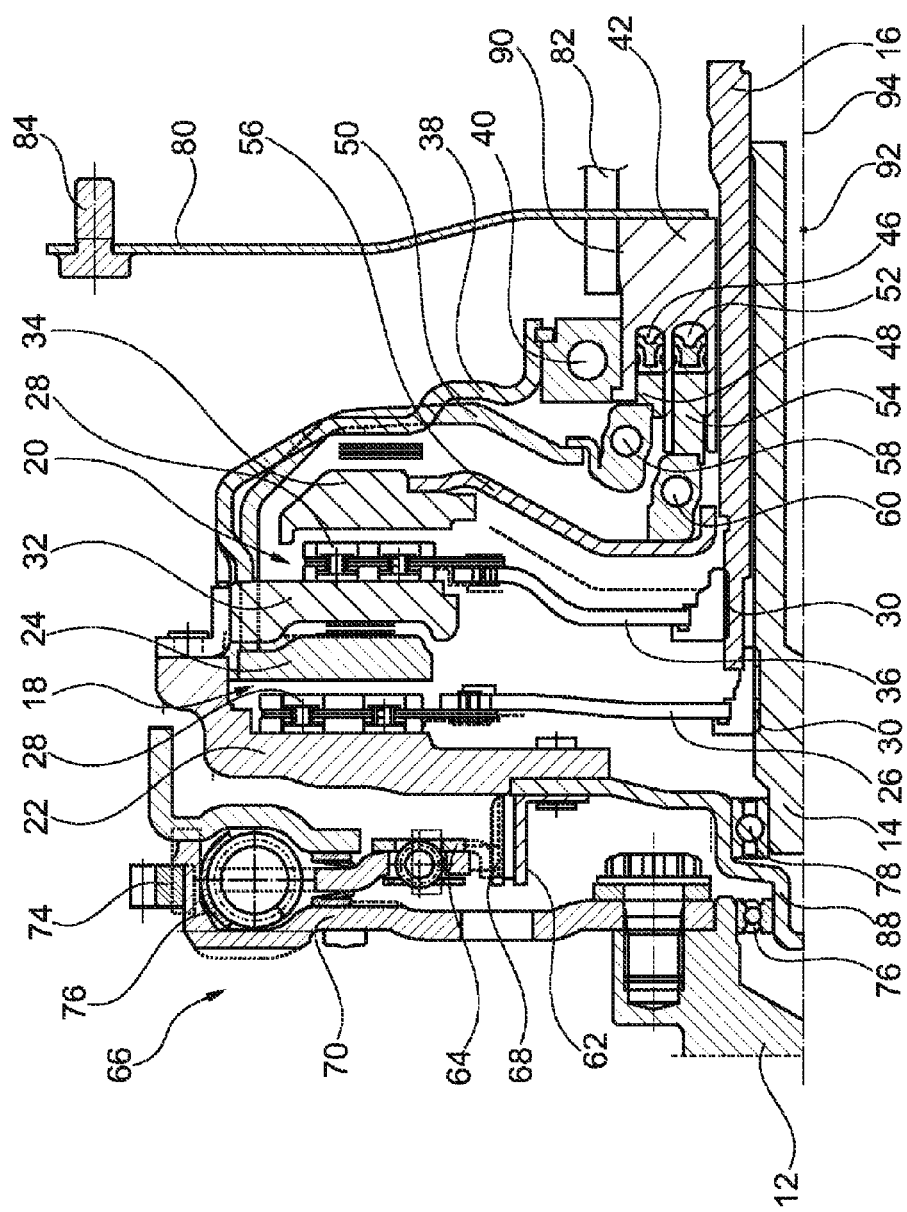
FIG. 5 is a schematic sectional view of a dual clutch in a fifth embodiment; and, FIG. 6 is a schematic sectional view of a dual clutch in a sixth embodiment.

In comparison to the embodiment of the dual clutch 10 shown in FIG. 4, the bearing hub 88 is additionally braced against the first output shaft 14 via the input bearing 78 in the exemplary embodiment of the dual clutch 10 portrayed in FIG. 5. Additional radial bracing of the dual clutch 10 can thereby be achieved to further simplify the installation of the bearing hub 88 with the pilot bearing 76. In addition, the radial load on the clutch disks 26, 36 and wear of the friction lining 28 is reduced.

Figure 6:
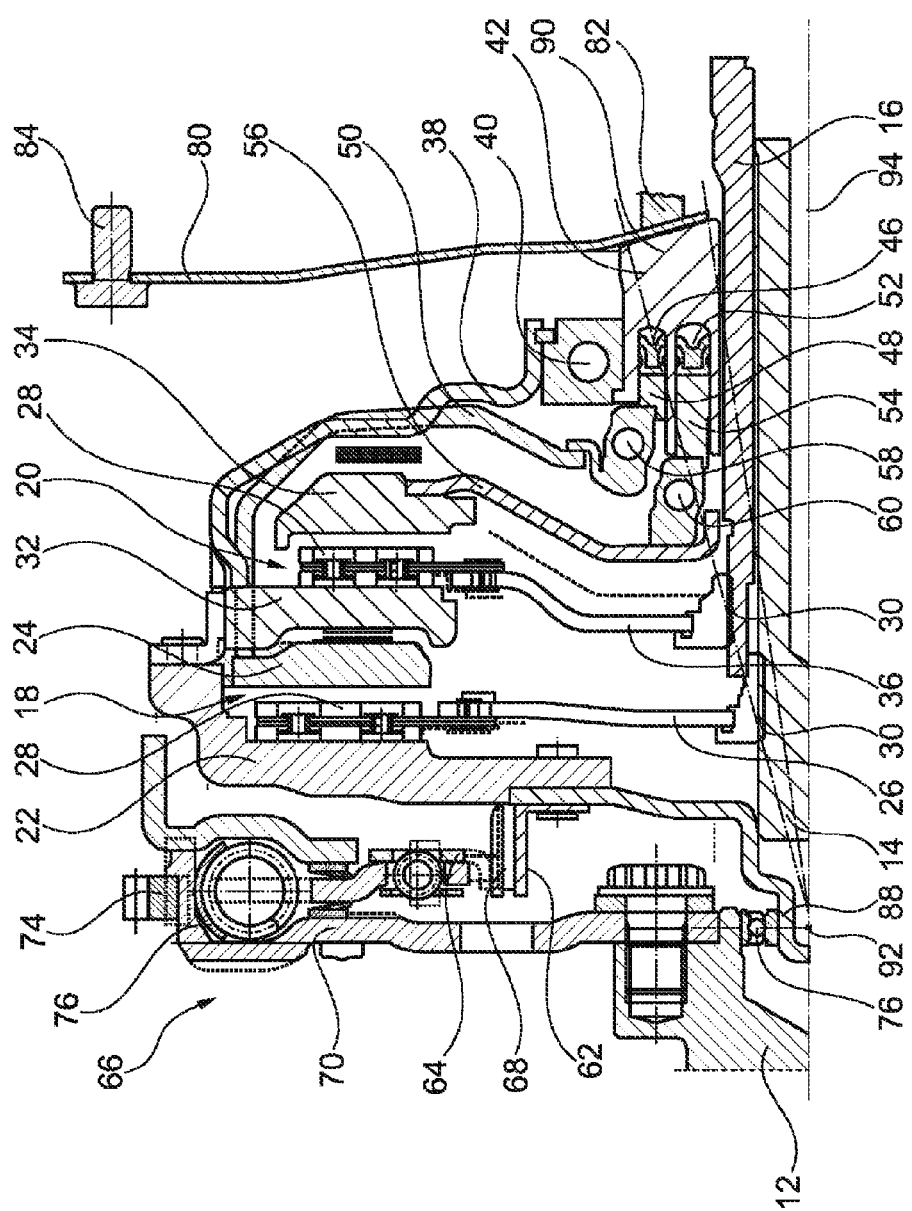

In comparison to the embodiment of the dual clutch 10 shown in FIG. 4, the bearing ball 90 is at least partially formed in an axial direction as well as in the embodiment of the dual clutch 10 shown in FIG. 6. The clutch housing 82 can have a corresponding concave design. The bearing ball 60 and the clutch housing 82 can thereby function in a manner comparable to a ball joint and compensate in a particularly easy manner for the tilting of the rotary axis 94 in relation to the dual clutch 10. The theoretical midpoint 92 of the curvature of the bearing ball 90 is basically axially in the middle at the level of the pilot bearing 76 in the portrayed embodiment. In addition, the fastening plate 80 designed as a flexplate is clamped between the bearing ball 90 and the concave design of the clutch housing 82. During installation, the dual clutch 10 can be shoved on the output shafts 14, 16 until the bearing ball 90 interacts with the clutch housing 82 and automatically compensates for tilting errors. At the same time, the axial position of the dual clutch 10 is thereby defined.

Furthermore, it is possible to combine the different transmission-side supports shown in FIG. 1 to FIG. 6 with the engine-side supports shown in FIG. 1 to FIG. 6. In addition, the fastening plate 80 can be optionally designed as an axially yielding flexplate or as an axially unyielding bracing plate in all possible combinations depending on the application.

REFERENCE NUMERALS

10 Dual clutch
12 Input shaft
14 First output shaft
16 Second output shaft
18 First clutch
20 Second clutch
22 First counterplate
24 First pressure plate
26 First clutch disk
28 Friction lining
30 Gearing
32 Second counterplate
34 Second pressure plate
36 Second clutch disk
38 Clutch cover
40 Cover bearing
42 Actuating device
46 First pressure cylinder 48 First piston
50 First actuating cup
52 Second pressure cylinder
54 Second piston
56 Second actuating cup
58 First cup bearing
60 Second cup bearing
62 Catch
64 Output flange
66 Dual-mass flywheel
68 Spline connection
70 Input flange
72 Bow spring
74 Starter crown
76 Pilot bearing
78 Input bearing
80 Fastening plate
82 Clutch housing
84 Threaded connection
86 Stop
88 Bearing hub
90 Bearing ball
92 Theoretical midpoint
94 Rotary axis

What is claimed is:

1. A dual clutch for engaging an engine-side input shaft having a first transmission-side output shaft, a second transmission-side output shaft, or a first and second transmission-side output shafts comprising:
   a first clutch comprising:
      a first counterplate with a radially innermost end; and,
      a first pressure plate that is axially movable relative to the first counterplate for engaging a first clutch disk connected to the first output shaft;
   a second clutch comprising:
      a second counterplate; and,
      a second pressure plate that is axially movable relative to the second counterplate for engaging a second clutch disk connected to the second output shaft;
   an input bearing:
      directly engaged with the first transmission-side output shaft and with the radially innermost end of the first counterplate; and,
      at least partially radially disposed between the first transmission-side output shaft and the radially innermost end of the first counterplate;
   an actuating device for moving said first pressure plate, said second pressure plate, or said first and second pressure plates; and,
   a fastening plate connected to said actuation device for axially fastening to a clutch housing of said dual clutch, a transmission housing of a motor vehicle transmission, or said clutch housing of said dual clutch and said transmission housing of a motor vehicle transmission, wherein said actuating device is designed to pre-center relative to said clutch housing, said transmission housing, or said clutch housing and said transmission housing in a radially adjustable manner, and said fastening plate is designed to be radially fixed to said clutch housing, said transmission housing, or said clutch housing and said transmission housing.

2. The dual clutch recited in claim 1, wherein said first counterplate is braced in an axially fixed manner with the assistance of said input bearing.

3. The dual clutch recited in claim 1, wherein said first counterplate is braced in an axially movable manner with the assistance of said input bearing.

4. The dual clutch recited in claim 1, wherein said first counterplate is braced against said input shaft by means of a bearing hub.

5. The dual clutch recited in claim 1, wherein said first counterplate is braced within said input shaft by means of a bearing hub.

6. The dual clutch recited in claim 1, wherein said actuating device comprises an annular peripheral bearing ball that projects radially, axially, or radially outward for contacting a bearing surface of said clutch housing, said transmission housing, or said clutch housing and said transmission housing.

7. The dual clutch recited in claim 6, wherein said bearing ball comprises a selected curvature having a theoretical midpoint and said theoretical midpoint is on a rotary axis of said first output shaft and said second output shaft.

8. The dual clutch recited in claim 1, wherein said first counterplate is connected to at least one catch projecting axially at the engine side.

9. The dual clutch recited in claim 8, wherein said at least one catch is operatively arranged such that a spline connection is created with a torsional vibration damper.

10. The dual clutch recited in claim 9, wherein said spline connection is created with a dual-mass flywheel.

11. The dual clutch recited in claim 1, wherein said actuating device further comprises a first piston and a second piston, said first piston having a first actuation path and said first piston axially moves said first pressure plate with the assistance of a first actuating cup, said second piston having a second actuation path and said second piston axially moves said second pressure plate with the assistance of a second actuating cup, wherein said first actuation path corresponds to a first displacement path of said first pressure plate, said second actuation path corresponds to a second displacement path of said second pressure plate, or said first and said second actuation paths correspond to said first and second displacement paths.

12. The dual clutch recited in claim 1, wherein said actuating device further comprises a first annular pressure cylinder to move said first pressure plate, and a second annular pressure cylinder to move said second pressure plate, wherein said first pressure cylinder and said second pressure cylinder are arranged coaxially in relation to each other.

13. A gear drivetrain for a motor vehicle comprising a motor-side input shaft, a first transmission-side output shaft, a second transmission-side output shaft and a dual clutch recited in claim 1 for engaging said input shaft with said first output shaft, said second output shaft, or said first and second output shafts.

* * * * *